United States Patent
Deldalle et al.

(10) Patent No.: US 11,319,884 B2
(45) Date of Patent: May 3, 2022

(54) FUEL DISTRIBUTOR VALVE FOR FUEL INJECTOR AND METHOD FOR OPERATING SUCH A DISTRIBUTOR VALVE

(71) Applicant: SAFRAN AIRCRAFT ENGINES, Paris (FR)

(72) Inventors: Regis Michel Paul Deldalle, Moissy-Cramayel (FR); Pierre Charles Mouton, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 97 days.

(21) Appl. No.: 16/822,791

(22) Filed: Mar. 18, 2020

(65) Prior Publication Data

US 2020/0300178 A1    Sep. 24, 2020

(30) Foreign Application Priority Data

Mar. 20, 2019    (FR) ..................................... 1902839

(51) Int. Cl.
*F02C 9/26*    (2006.01)
*F23R 3/28*    (2006.01)

(52) U.S. Cl.
CPC ................ *F02C 9/263* (2013.01); *F23R 3/28* (2013.01); *F05D 2220/323* (2013.01)

(58) Field of Classification Search
CPC .... F02C 9/26; F02C 9/263; F02C 9/28; F23R 3/28; F23R 3/283
See application file for complete search history.

(56) References Cited

U.S. PATENT DOCUMENTS

| | | | | |
|---|---|---|---|---|
| 4,569,202 A | * | 2/1986 | Mouton | F04C 14/24 |
| | | | | 417/295 |
| 5,772,182 A | * | 6/1998 | Stambaugh, Sr | F02C 9/263 |
| | | | | 251/325 |
| 5,941,074 A | | 8/1999 | Schultz | |
| 5,983,621 A | | 11/1999 | Stambaugh, Sr. et al. | |
| 6,782,692 B2 | * | 8/2004 | Hodinot | F02C 7/232 |
| | | | | 137/625.48 |
| 8,511,329 B1 | * | 8/2013 | Rickis | G05D 7/0635 |
| | | | | 137/15.21 |
| 2009/0301575 A1 | | 12/2009 | Arnett | |

(Continued)

OTHER PUBLICATIONS

Search Report from French Intellectual Property Office on corresponding FR application (FR1902839) dated Nov. 8, 2019.

*Primary Examiner* — Todd E Manahan
*Assistant Examiner* — Thuyhang N Nguyen
(74) *Attorney, Agent, or Firm* — Klein, O'Neill & Singh, LLP

(57) ABSTRACT

A distributor valve comprising a second element configured to be displaced relative to a first element, so as to form an overall passage opening of variable fuel passage section corresponding to the intersection of a first passage opening and a second passage opening. The head portion of the second passage opening comprises a first inclination having a first average slope, the intermediate portion of the second passage opening comprises a second inclination having a second average slope strictly greater than said first average slope, and the foot portion of the second passage opening comprises a third inclination having a third average slope, strictly less than said second average slope.

20 Claims, 6 Drawing Sheets

(56) References Cited

U.S. PATENT DOCUMENTS

2013/0238215 A1* 9/2013 Florentin ............... F02C 7/22
                                                  701/100
2016/0076452 A1* 3/2016 Striker .................. F02C 9/28
                                                  60/734
2018/0209344 A1    7/2018 Brocard et al.

* cited by examiner

FUEL DISTRIBUTOR VALVE FOR FUEL INJECTOR AND METHOD FOR OPERATING SUCH A DISTRIBUTOR VALVE

TECHNICAL FIELD

The present invention relates to a fuel system for a turbine engine mounted in an aircraft and, more particularly, a fuel distributor valve in a fuel injector of a fuel system.

In a known manner, an airplane comprises a turbine engine comprising a combustion chamber and a fuel system making it possible to supply the combustion chamber with fuel. To do so, the fuel system comprises a low pressure pump, connected upstream to a fuel tank of the airplane and associated downstream with a high pressure pump. The high pressure pump supplies a fuel doser, making it possible to regulate the fuel flow rate supplying the fuel injectors. Each fuel injector makes it possible to inject a flow of fuel into the combustion chamber of the engine. For the sake of clarity and brevity, in the remainder of this document, a fuel injector will be designated by the term "injector".

In a known manner, with reference to FIG. 1, an injector 100 comprises:
- an inlet 101, connected to the fuel doser,
- a primary outlet 102a emerging in the combustion chamber and connected to the inlet 101 by a primary stream Ca, and
- a secondary outlet 102b emerging in the combustion chamber and connected to the inlet 101 by a secondary stream Cb.

Given that the injector 100 comprises two outlets 102a, 102b, the injector 100 is qualified as a "dual flow injector". Such an injector 100 is known from the prior art. Each outlet 102a, 102b is known to those skilled in the art under the designation "swirler" and is configured to make it possible to inject a flow of fuel so as to generate a swirling flow and thus favour the dispersion of a mixture of air and fuel in the combustion chamber.

To make it possible to distribute the flow of fuel received at the inlet between the two outlets 102a, 102b, the injector 100 comprises a distributor valve 110, in the secondary stream Cb, which makes it possible to supply a given fuel flow rate as a function of the pressure difference between an inlet pressure P1 and an intermediate pressure P2 which is measured between the distributor valve 110 and the secondary outlet 102b (FIG. 1).

In a known manner, with reference to FIG. 2, a distributor valve 110 of an injector 100 comprises:
- a first element comprising at least one first passage opening 111,
- a second element comprising at least one second passage opening 112,
- the second element being configured to be displaced relative to said first element, according to a translation movement along a given axis X, as a function of the pressure difference between the inlet pressure P1 and the intermediate pressure P2, extending from the inlet to the outlet of the fuel injector 100, so as to form an overall fuel passage opening 113, of variable section, corresponding to the intersection of the first passage opening 111 and the second passage opening 112.

Such a distributor valve 1100 makes it possible to carry out a homogeneous circumferential injection into the combustion chamber and thus to avoid malfunctions or early wear of the turbine engine.

In practice, the overall passage opening 113 varies between a low flow rate position wherein the second passage opening 112 is partially opposite the first passage opening 111 and a high flow rate position wherein the second passage opening 112 is to a large extent opposite the first passage opening 111. The shape of the second passage opening 112 has a functional role which has an influence on the behaviour of the combustion chamber and, as a result, on the turbine engine.

With reference to FIGS. 2 and 3, the first passage opening 111 has a constant profile, for example rectangular, and the second passage opening 112 has, in radial section, a profile consecutively comprising a foot portion 112C, an intermediate portion 112B and a head portion 112A. The distributor valve 110 is configured to place successively the head portion 112A, the intermediate portion 112B and the foot portion 112C opposite the first passage opening 111 when the fuel flow rate increases, that is to say when the overall passage opening 113 evolves between the low flow rate position and the high flow rate position.

In a known manner, the outlets 102a, 102b (swirlers) emerge in the combustion chamber. Advantageously, the temperature and the radiation of the combustion chamber protect them against icing. The distributor valve 110 remains, for its part, sensitive to icing given that it has to have a passage section smaller than or of the same order as that of the outlets 102a, 102b. Given that the section of the outlets 102a, 102b is necessarily small to ensure good atomization in the combustion chamber, the distributor valve 110 has a small section, which makes it sensitive to icing.

In practice, the head portion 112A is narrower than the intermediate portion 112B which is narrower than the foot portion 112C. Thus, during the travel of the second element, the overall passage opening 113 increases rapidly, for example, exponentially. Thus, the profile of the second passage opening 112 is determined to supply an optimal fuel flow rate as a function of the pressure difference P1, P2.

In practice, at low flow rate, when the pressure difference P1, P2 is low, with reference to FIG. 4, only the head portion 112A of the second passage opening 112 is uncovered, that is to say, opposite the first passage opening 111. At medium flow rate, when the pressure difference P1, P2 is medium, with reference to FIG. 5, only the head portion 112A and the intermediate portion 112B of the second passage opening 112 are uncovered, that is to say, opposite the first passage opening 111. At high flow rate, when the pressure difference P1, P2 is high, with reference to FIG. 6, the head portion 112A, the intermediate portion 112B and the foot portion 112C of the second passage opening 112 are uncovered, that is to say, opposite the first passage opening 111.

Furthermore, the fuel supply system must be protected against the risk of icing of water contained in the fuel. Indeed, the pressure and the temperature encountered in the course of a flight may cause the passage of water from the liquid state to the solid state, forming ice particles which may lead to malfunctions in the fuel supply circuit.

For example, with reference to FIGS. 7 to 9, when the temperature drops, ice particles 119 build up progressively on the periphery of the second passage opening 112 which is uncovered, which has the consequence of reducing the overall passage opening 113. The result is that the combustion chamber does not receive a sufficient fuel flow rate. To eliminate this drawback, the inlet pressure P1 is increased to command a displacement of the second element and to enable an increase in the overall passage opening 113. However, as the second passage opening 112 uncovers, the build up of ice particles 119 continues at the periphery of the second passage opening 112. This progressive clogging of the second passage opening 112 prevents optimal regulation of the fuel, which has a drawback. In addition, in position of maximum flow rate, that is to say when the second passage opening 112 is entirely uncovered (FIG. 9), the overall passage opening 113 may be insufficient on account of the icing built up progressively, which presents another drawback.

To date, no solution preventing the build up of icing in a fuel distributor valve of an injector has been proposed. An immediate solution would be to provide additional equipment for heating the fuel or to remove the icing mechanically. However, such solutions impose modifying the whole of the fuel system and are not desirable.

To limit these drawbacks, the objective of the invention is to propose an improved fuel distributor valve which can be mounted in a fuel injector making it possible to limit the risk of clogging by icing, in particular, when a high fuel flow rate is required.

SUMMARY

To this end, the invention relates to a distributor valve for fuel injector of a fuel injection system of an aircraft, said fuel injector comprising a fuel inlet, a primary outlet configured to emerge in a combustion chamber and connected to the fuel inlet by a primary stream, a secondary outlet configured to emerge in the combustion chamber and connected to the inlet by a secondary stream and a distributor valve, in the secondary stream, which makes it possible to supply a given fuel flow rate as a function of the pressure difference between an inlet pressure P1 measured at the fuel inlet, and an intermediate pressure P2 which is measured, in the secondary stream, between the distributor valve and the secondary outlet.

The distributor valve comprises:
- a first element comprising at least one first passage opening,
- a second element comprising at least one second passage opening,
- the second element being configured to be displaced relative to said first element, according to a translation movement along a given axis X as a function of the pressure difference between the inlet pressure P1 and the intermediate pressure P2, extending from the inlet to the outlet of the fuel injector, so as to form an overall fuel passage opening, of variable section, corresponding to the intersection of the first passage opening and the second passage opening,
- the overall passage opening varying between a low flow rate position wherein the second passage opening is partially opposite the first passage opening and a high flow rate position wherein the second passage opening is to a large extent opposite the first passage opening,
- the second passage opening having a radial section having a profile consecutively comprising a foot portion, an intermediate portion and a head portion,
- the distributor valve being configured to place successively the head portion, the intermediate portion and the foot portion opposite the first passage opening during an increase of the fuel flow rate, that is to say when the overall passage opening evolves between the low flow rate position and the high flow rate position.

The distributor valve according to the invention is remarkable in that:
- the head portion of the second passage opening comprises a first inclination having a first average slope,
- the intermediate portion of the second passage opening comprises a second inclination having a second average slope strictly greater than said first average slope, and
- the foot portion of the second passage opening comprises a third inclination having a third average slope, strictly less than said second average slope.

Such a distributor valve advantageously makes it possible to limit the risks of clogging of the overall passage opening by ice particles. Thus, thanks to the invention, the distributor valve does not risk generating an overpressure in the fuel injection system of a turbine engine, which can lead to stoppage of the engine or insufficient thrust.

Even at low fuel flow rate, the distributor valve makes it possible to ensure the passage of a predetermined amount of fuel, while ensuring a rapid positioning of the head portion to the foot portion of the second passage opening opposite the first passage opening. Ice particles having a tendency to attach themselves to the edges of the overall passage opening, the distributor valve thus has rapidly a substantial passage opening not leaving time for icing to build up and to obstruct it.

In addition, the distributor valve according to the invention makes it possible to limit the addition of de-icing additive into the fuel injection system of an engine, which has at one and the same time advantages in terms of maintenance, cost and labour.

According to a characteristic of the invention, the second passage opening extending over a length defined along the axis X, the foot portion of the second passage opening extends over a length equal to at least 20% of the maximum length. Such a relative length makes it possible to ensure the passage from the head portion to the foot portion of the second passage opening in a rapid and efficient manner.

Preferably, the foot portion of the second passage opening extends over a length equal to at least 30% of the maximum length.

Further preferably, the foot portion of the second passage opening extends over a length equal to at least 40% of the maximum length.

According to a preferred embodiment of the invention, the foot portion of the second passage opening extends over a length equal to at least 50% of the maximum length.

Preferably, the foot portion of the second passage opening extends over a length equal to at least 60% of the maximum length, advantageously making it possible to be free of risks of clogging of the overall passage opening by the build up of ice particles.

According to an aspect, the head portion comprises a maximum width at a curvature point B at the interface between the head portion and the intermediate portion. The foot portion comprises a minimum width at a curvature point C at the interface between the foot portion and the intermediate portion. The ratio of the widths DC/DB is greater than a threshold S which is greater than or equal to 2, preferably, greater than 2.5.

Preferably, the foot portion comprises a minimum width at a curvature point C at the interface between the foot portion and the intermediate portion, the minimum width is greater than or equal to 60% of the maximum width of the second passage opening.

Preferably, the minimum width is greater than or equal to 80% of the maximum width of the second passage opening. An important width makes it possible to allow a passage of fuel even in the event of icing.

The invention also relates to a distributor valve for fuel injector of a fuel injection system of an aircraft, said fuel injector comprising a fuel inlet, a primary outlet configured to emerge in a combustion chamber and connected to the fuel inlet by a primary stream, a secondary outlet configured to emerge in the combustion chamber and connected to the inlet by a secondary stream and a distributor valve, in the secondary stream, which makes it possible to supply a given fuel flow rate as a function of the pressure difference between an inlet pressure P1 measured at the fuel inlet, and an intermediate pressure P2 which is measured, in the secondary stream, between the distributor valve and the secondary outlet.

The distributor valve comprises:
 a first element comprising at least one first passage opening,
 a second element comprising at least one second passage opening,
 the second element being configured to be displaced relative to said first element, according to a translation movement along a given axis X as a function of the pressure difference between the inlet pressure P1 and the intermediate pressure P2, extending from the inlet to the outlet of the fuel injector, so as to form an overall fuel passage opening, of variable section, corresponding to the intersection of the first passage opening and the second passage opening,
 the overall passage opening varying between a low flow rate position wherein the second passage opening is partially opposite the first passage opening and a high flow rate position wherein the second passage opening is to a large extent opposite the first passage opening,
 the second passage opening having a radial section having a profile consecutively comprising a foot portion, an intermediate portion and a head portion,
 the distributor valve being configured to place successively the head portion, the intermediate portion and the foot portion opposite the first passage opening during an increase of the fuel flow rate, that is to say when the overall passage opening evolves between the low flow rate position and the high flow rate position.

The distributor valve is remarkable in that the head portion comprises a maximum width at a curvature point B at the interface between the head portion and the intermediate portion and the foot portion comprises a minimum width at a curvature point C at the interface between the foot portion and the intermediate portion. The ratio of the widths DC/DB is greater than a threshold S which is greater than or equal to 2, preferably, greater than 2.5.

The invention also relates to a fuel injector comprising a distributor valve such as described previously.

The invention finally relates to a method for operating a fuel distributor valve such as described previously, said method comprising:
 a step of partial positioning of the head portion of the second passage opening opposite the first passage opening,
 a step of translation of the second element relative to said first element in the event of obstruction by ice particles of the head portion of the second passage opening opposite the first passage opening so as to increase the overall fuel passage opening.

The invention also relates to a method for operating a distributor valve such as described previously, said method comprising:
 a step of comparison of the current fuel flow rate with a predetermined icing threshold,
 a step of positioning the head portion and the intermediate portion of the second passage opening opposite the first passage opening in the event of exceeding said predetermined icing threshold.

Icing threshold is taken to mean the fuel flow rate threshold above which the fuel does not have sufficient time to heat up in the engine before arriving at the fuel injector. Such a fuel icing threshold is known to those skilled in the art.

Such a method makes it possible to guarantee an overall passage opening which is sufficiently large to enable optimal circulation of a flow of fuel which has not been sufficiently heated and which is liable to icing.

Preferably, the method comprises a step of comparison of the current fuel flow rate with a predetermined icing threshold and a step of positioning the head portion, the intermediate portion and the foot portion of the second passage opening opposite the first passage opening in the event of exceeding said predetermined icing threshold.

An overall opening of large dimensions makes it possible to ensure a sufficient fuel flow rate under icing conditions.

BRIEF DESCRIPTION OF THE DRAWINGS

The invention will be better understood on reading the description that follows, given uniquely as an example, and by referring to the appended drawings given as non-limiting examples, wherein identical references are given to similar objects and in which.

It should be noted that the figures set out the invention in a detailed manner for implementing the invention, said figures obviously being able to serve to better define the invention if need be.

DETAILED DESCRIPTION

Figure 10:
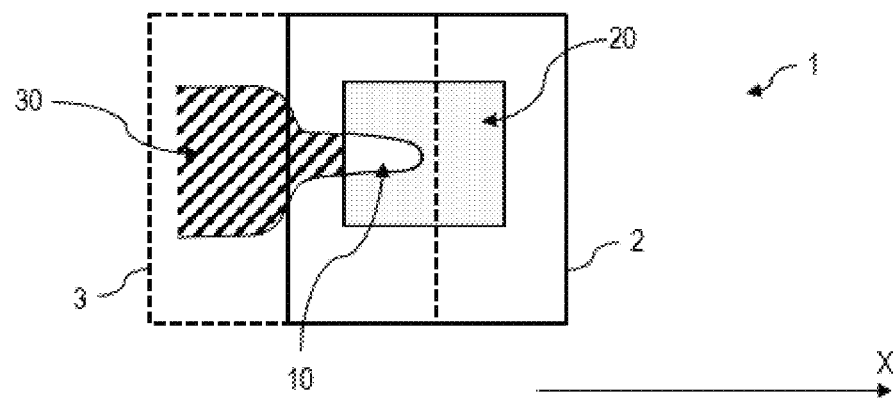
FIG. 10 schematically represents a distributor valve according to an exemplary representation of the invention.

With reference to FIG. 10, a fuel distributor valve 1 according to the invention is represented, configured to be mounted in a fuel injector 100 of a fuel injection system integrated in a turbine engine of an airplane, as will be described in greater detail hereafter in this document. For the sake of brevity, a fuel injector will be designated hereafter by the term "injector".

Figure 1:
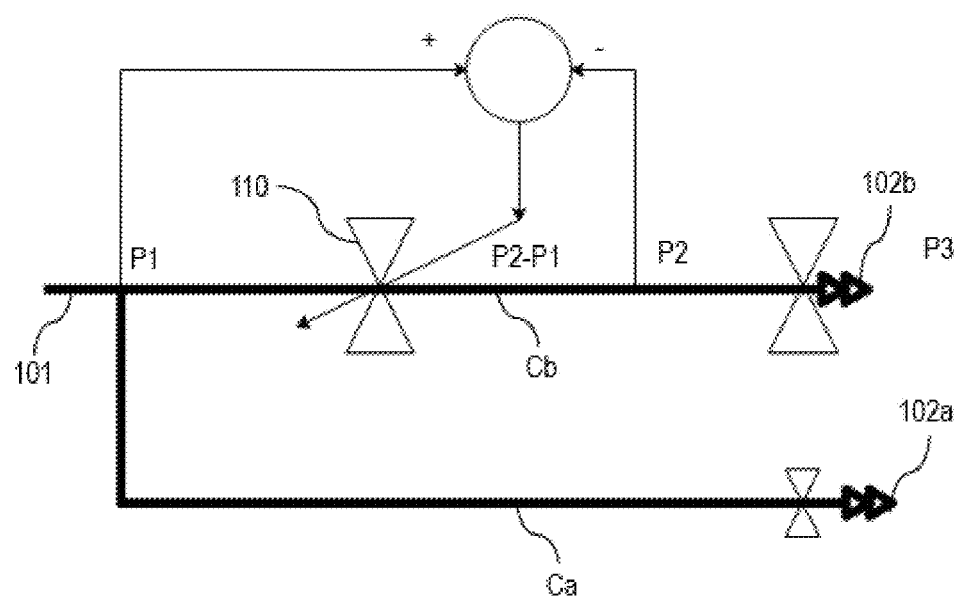
FIG. 1 is a schematic representation of a dual flow fuel injector comprising a fuel distributor valve.
Figure 2:
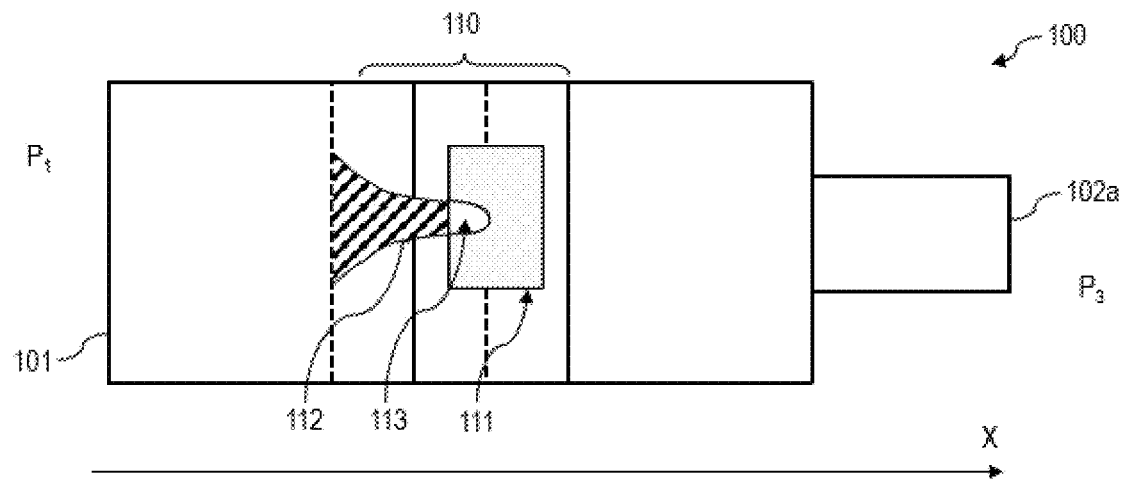
FIG. 2 is a schematic representation of a fuel distributor valve of the prior art.
Figure 3:
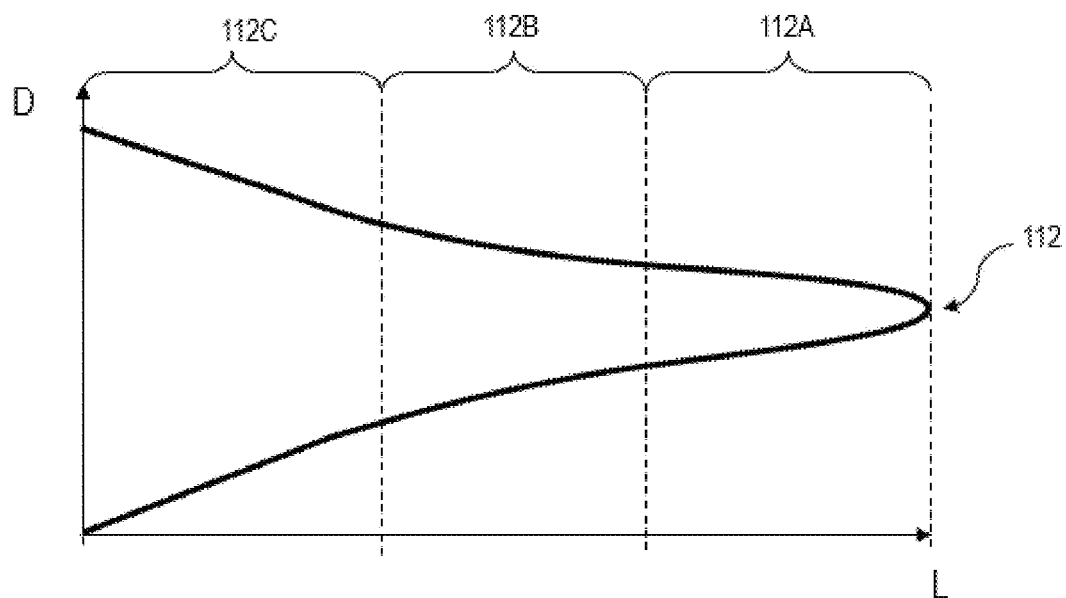
FIG. 3 schematically represents the profile in longitudinal section of a second passage opening of the distributor valve of the prior art of FIG. 2.
Figure 4:
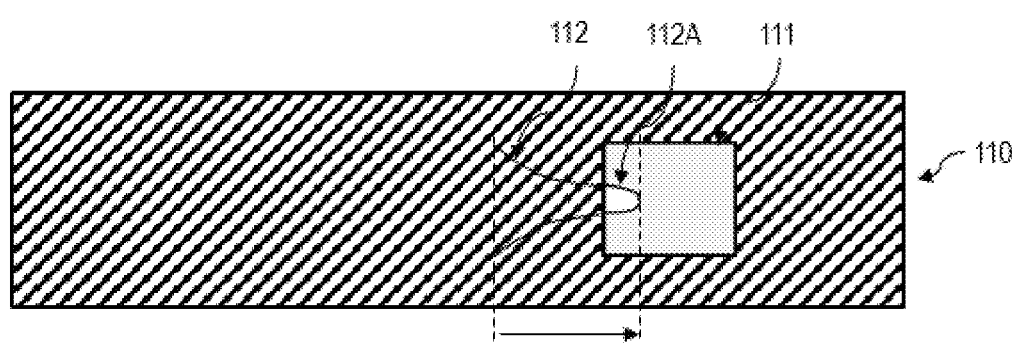
FIG. 4, FIG. 5, and FIG. 6 are schematic representations of respectively low flow rate, average flow rate and high flow rate positions of the distributor valve of FIG. 2.
Figure 5:
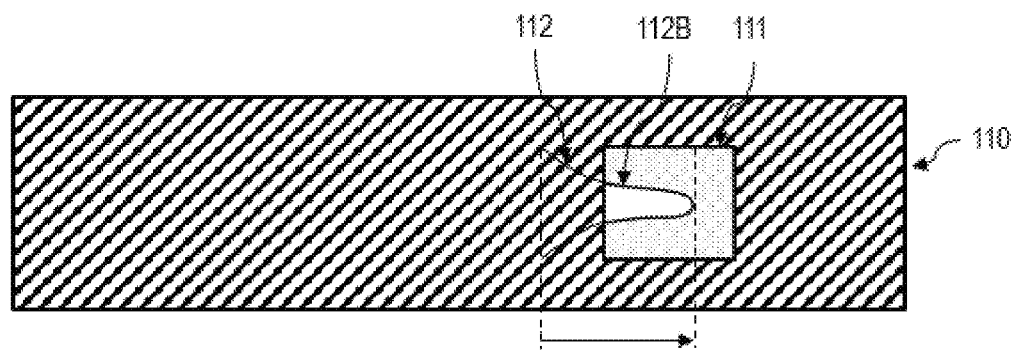
Figure 6:
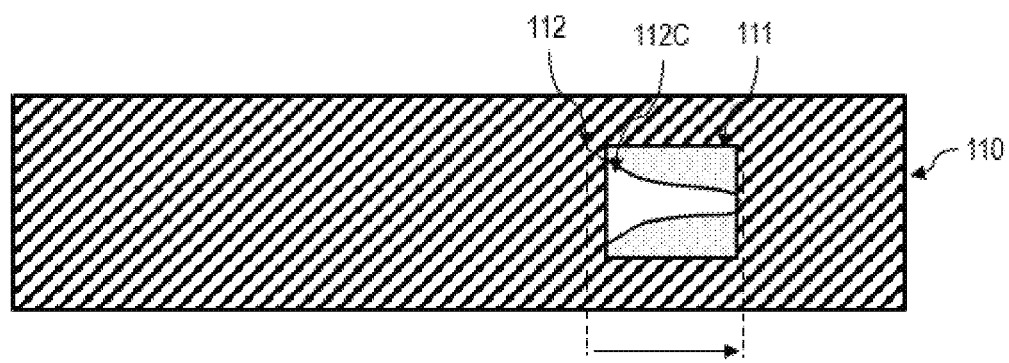
Figure 7:
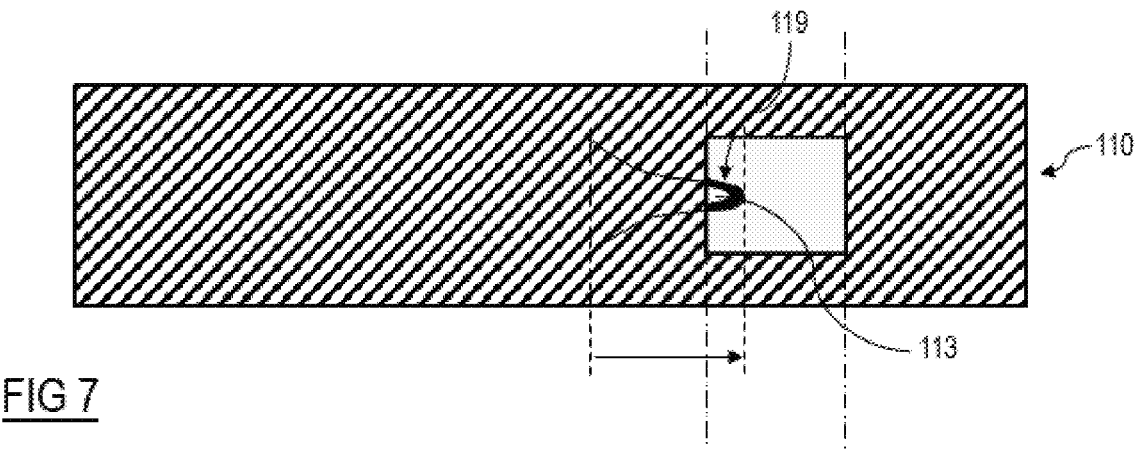
FIG. 7, FIG. 8, and FIG. 9 are schematic representations of the evolution of the build up of ice particles in a distributor valve of the prior art.
Figure 8:
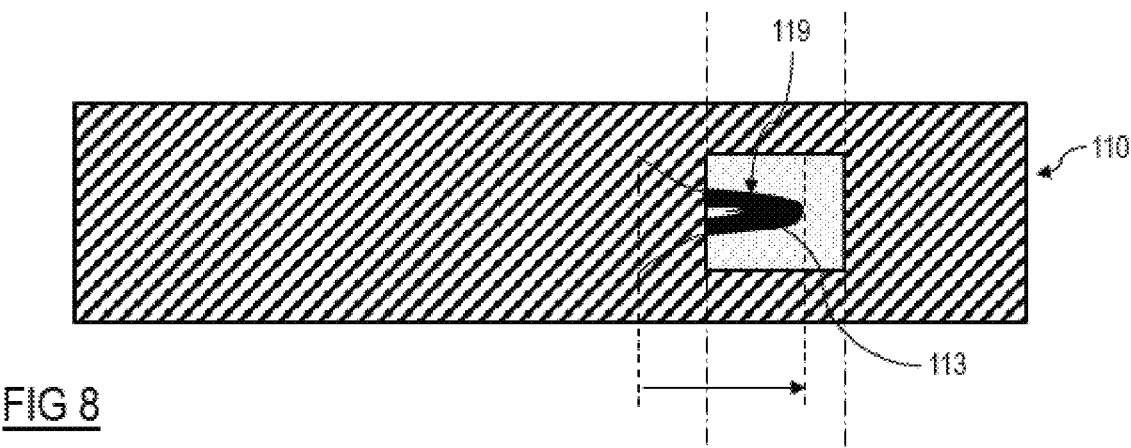
Figure 9:
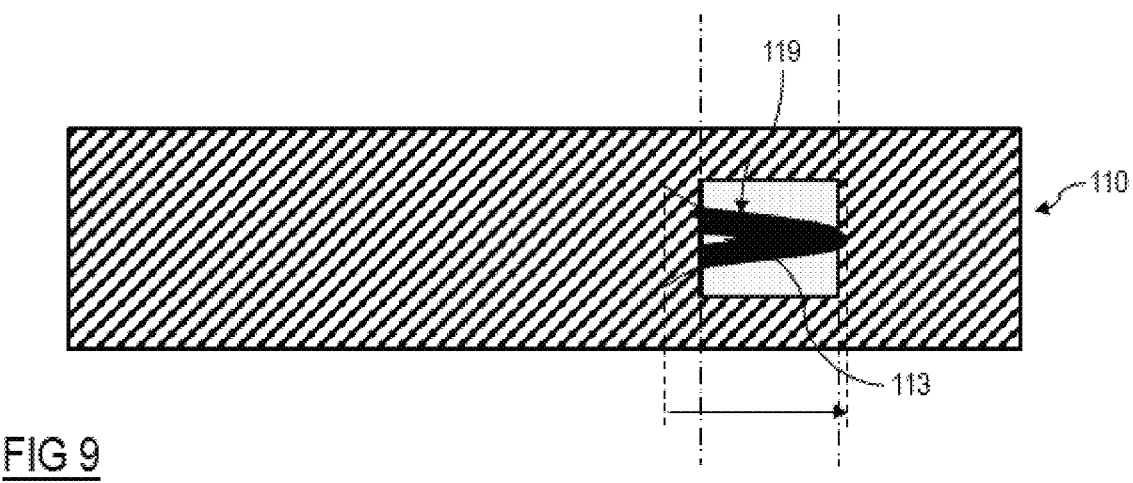

As described previously with reference to FIG. 1, an injector 100 is configured to be mounted in a fuel injection system comprising a combustion chamber, making it possible to ensure the combustion of a mixture of air and fuel necessary for the operation of the turbine engine. The injector 100 comprises:
- a fuel inlet 101, connected to a fuel tank,
- a primary outlet 102a configured to emerge in a combustion chamber and connected to the fuel inlet 101 by a primary stream Ca,
- a secondary outlet 102b configured to emerge in the combustion chamber and connected to the inlet by a secondary stream Cb and a distributor valve 1, in the secondary stream, which makes it possible to supply a given fuel flow rate as a function of the pressure difference between an inlet pressure P1 measured at the fuel inlet 101, and an intermediate pressure P2 which is measured, in the secondary stream Cb, between the distributor valve 1 and the secondary outlet 102b. The secondary outlet 102 is configured to enable the injection of an amount of fuel in the combustion chamber which is variable between a minimum amount and a maximum amount. The general structure of a dual flow injector 100 is known to those skilled in the art and will not be described in further detail.

Figure 11:
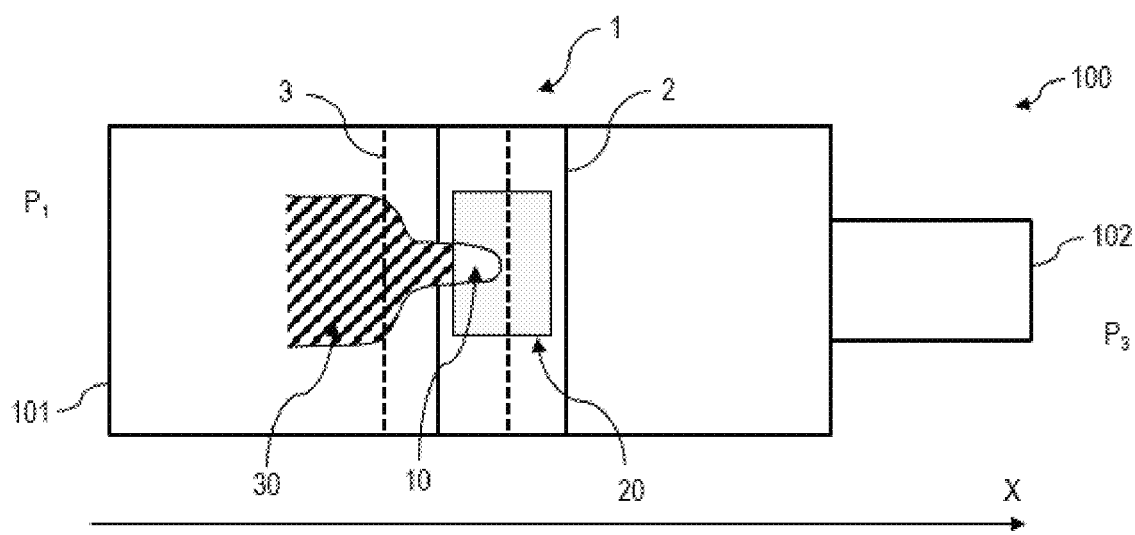
FIG. 11 schematically represents the distributor valve of FIG. 10 mounted in a fuel injector.

The injector 100 is defined with respect to an axis X, extending longitudinally in the injector 100 from the left to the right in FIG. 11, and defining the front and the rear of the injector 100. In other words, the fuel inlet 101 extends to the rear of the injector 100 and the secondary outlet 102, to the front. In other words, the terms front and rear are defined with reference to the direction of flow of fuel in the injector 100.

Such an injector 100 comprises a distributor valve 1 according to the invention, configured to distribute the amount of fuel between the primary outlet 102a and the secondary outlet 102b.

The distributor valve 1 according to the invention is configured to supply a given fuel flow rate as a function of the pressure difference between an inlet pressure P1 reigning in the fuel inlet 101 and an intermediate pressure P2 reigning in the secondary stream Cb, between the distributor valve 1 and the secondary outlet 102b. To do so, as represented in FIGS. 10 and 11, such a distributor valve 1 comprises a first element 2 and a second element 3 configured to be displaced relative to said first element 2.

The first element 2 has, in this example, the shape of a hollow cylindrical tube of annular section, configured to enable its insertion into an injector 100. Such a first element 2 comprises a first passage opening 20, configured to be connected to the outlet of the injector 100. In this example, the first passage opening 20 has a constant profile, for example a rectangular shape, and is configured to enable the flow of fuel, introduced beforehand upstream into the injector 100.

The second element 3 is configured to be displaced relative to the first element 2 in a translation movement along an axis X extending from the fuel inlet 101 to the secondary outlet 102 of the injector 100, as is represented in FIG. 11. Such a second element 3 has a shape configured to cooperate with the shape of the first element 2, so as to slide longitudinally with respect to the such first element 2. The second element 3 is configured to be displaced with respect to the first element 2 as a function of the pressure difference in the injector 100, that is to say the difference between the inlet pressure P1 and the intermediate pressure P2, defined previously.

In this example, a first element 2 which is fixed and a second element 3 which is moveable are shown. It goes without saying that the inverse is also possible, only a relative movement between the two elements 2, 3 being important.

The second element 3 comprises a second passage opening 30, configured to enable the passage of a predetermined amount of fuel, making it possible to regulate the fuel flow rate circulating in the injector 100. Indeed, the second passage opening 30 is configured to be progressively uncovered while being progressively positioned opposite the first passage opening 20, so as to form an overall passage opening 10.

Such an overall passage opening 10 is configured to have a variable section for passage of a flow of fuel corresponding to the intersection of the first passage opening 20 of the first element 2 and the second passage opening 30 of the second element 3, as is represented in FIGS. 10 and 11. The overall passage opening 10 is thus configured to vary between a low flow rate position wherein the second passage opening 30 is partially opposite the first passage opening 20 and a high flow rate position wherein the second passage opening 30 is to a large extent opposite the first passage opening 20.

Figure 12:
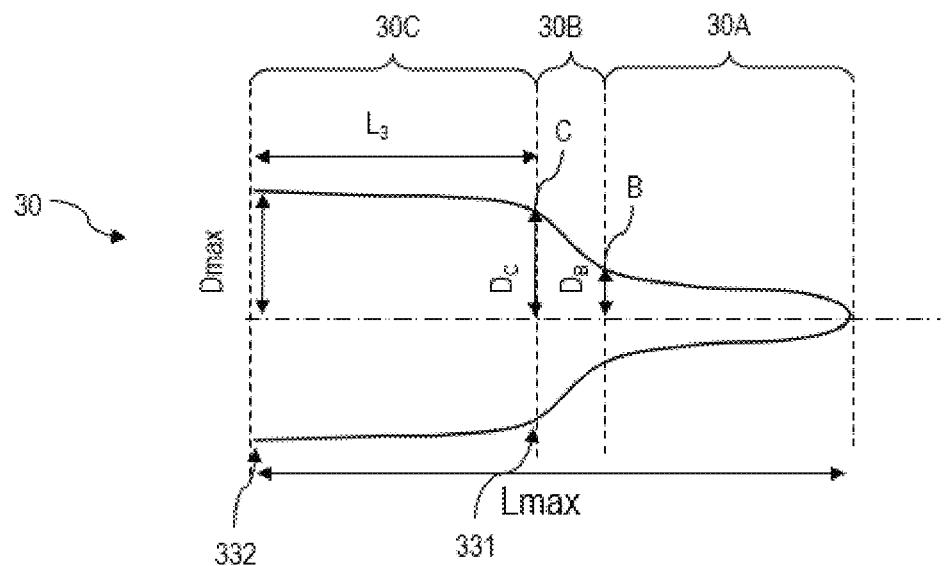
FIG. 12 schematically represents the profile in longitudinal section of a second passage opening of the distributor valve of FIG. 10 and FIG. 13 schematically represents a half profile in radial section of the second passage opening of the distributor valve of FIG. 12.
Figure 13:
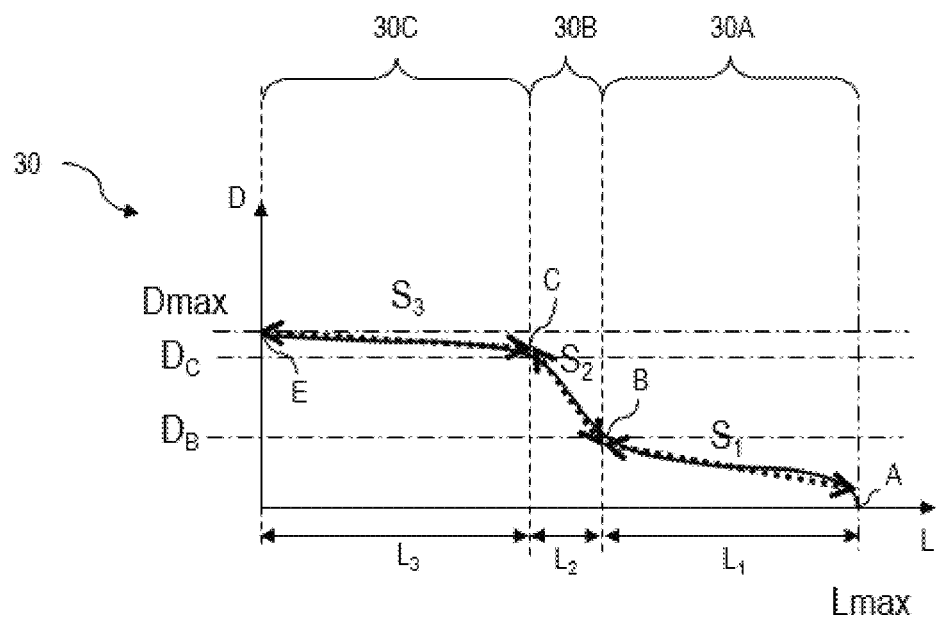

To do so, with reference to FIGS. 12 and 13, the second passage opening 30 has, in radial section, a profile consecutively comprising a foot portion 30C, an intermediate portion 30B and a head portion 30A. The distributor valve 1 is configured to place successively the head portion 30A, the intermediate portion 30B and the foot portion 30C opposite the first passage opening 20 when the fuel flow rate increases, that is to say when the overall passage opening 10 evolves between the low flow rate position and the high flow rate position, in other words, when the second element 3 is translated in the direction of the axis X.

According to a preferred embodiment of the invention, a view in radial section of the second passage opening 30 is represented in FIG. 13. In other words, FIG. 13 describes a curve representing a profile of the second passage opening 30. Such a curve thus comprises the profile of the head portion 30A, the profile of the intermediate portion 30B and the profile of the foot portion 30C. The profile of the second passage opening 30 is described graphically in FIG. 13 in an orthogonal coordinate system (L, D), wherein the profile is defined from the foot portion 30C up to the head portion 30A along a length L defined along the axis X and a width D defined radially with respect to the axis X.

In this example, the head portion 30A of the second passage opening 30 according to the invention extends between points A and B, the intermediate portion 30B extends between points B and C and the foot portion 30C extends between points C and E. In the coordinate system (L, D), the head portion 30A extends over a length L1, the intermediate portion 30B, over a length L2 and the foot portion 30C, over a length L3. The sum of the lengths L1, L2, L3 of each portion of the second passage opening 30 form the maximum length Lmax of the second passage opening 30. In other words, point A corresponds on the x-axis in the coordinate system (L, D) to the maximum length Lmax of the second passage opening 30. Similarly, point E corresponds in the coordinate system (L, D) on the y-axis to the maximum width Dmax. In addition, points B and C correspond to points of strong curvature of the curve representing the profile in the coordinate system (L, D). Preferably, the portions 30A, 30B, 30C are defined as a function of the points of strong curvature B, C. Strong curvature is taken to mean variation in the axis of the tangent. As an example, between points B-C, the tangent is substantially aligned with the straight line passing through B and C. Similarly, between points A-B, the tangent is substantially aligned with the straight line passing through A and B. It is at point B of strong curvature that the tangent modifies its orientation.

The head portion 30A comprises a maximum width DB at the curvature point B at the interface between the head portion 30A and the intermediate portion 30B. Similarly, the foot portion 30C comprises a minimum width DC at the curvature point C at the interface between the foot portion 30C and the intermediate portion 30B.

In order to enable an important variation in section in the event of icing, the ratio of widths DC/DB is greater than a threshold S wherein S is a constant greater than or equal to 2, preferably, greater than or equal to 2.5. Besides, the ratio DC/DB is lower than 5.

Still with reference to FIG. 13, the profile of the head portion 30A has a first inclination having, in the coordinate system (L, D), a first average slope S1 between points A and B. In this example, the first average slope S1 is defined according to the following formula: $S1=|DB-DA|/L1$. Similarly, the profile of the intermediate portion 30B has a second inclination having, in the coordinate system (L, D), a second average slope S2 between points B and C and the profile of the foot portion 30C has a third inclination having a third average slope S3 between points C and E. In this example, the head portion 30A, the intermediate portion 30B and the foot portion 30C are directly consecutive. Preferably, the second passage opening 30 is constituted by the head portion 30A, the intermediate portion 30B and the foot portion 30C.

According to a characteristic of the invention, the second average slope S2 is strictly greater than the first average slope S1 and the third average slope S3 is strictly less than the second average slope S2. In other words, the section of the second passage opening 30 has a non-constant profile between the head portion 30A and the foot portion 30C, advantageously enabling an important increase in section in an injector 100 even when the second element 3 is subjected to a small variation in pressure between the inlet pressure P1 and the intermediate pressure P2.

Such a section increase advantageously makes it possible to avoid the obstruction of the overall passage opening 10 even when ice particles are formed due to low temperatures for example when the distributor valve 1 is installed on an injector 100 mounted in a fuel injection system of a turbine engine of an airplane and when such an airplane is subjected to low temperatures. The risk of icing of the injectors often takes place at take off and with outside temperatures typically below −5° C., and more particularly below −15° C.

Preferably, the ratio L2/(L1+L2) is greater than 0.1, and preferably, greater than 0.2.

Such a profile advantageously makes it possible to position rapidly an important surface of the foot portion 30C of the second passage opening 30 opposite the first passage opening 20, making it possible to offset the build up of ice particles and thus to conserve the nominal flow rate in order not to have any operational impact for the airplane. The intermediate portion 30B enables a rapid increase of the passage section.

In a complementary or alternative manner, with reference to FIG. 12, the second passage opening 30 extends longitudinally along the axis X, defining the maximum length Lmax of the section as described previously. In this example, the foot portion 30C of the second passage opening 30 extends along a length L3. Moreover, the foot portion 30C extends along a variable width D comprised in this example between a minimum width DC and the maximum width Dmax. Such a minimum width DC corresponds to the width of the foot portion 30C at the level of the curvature point C.

According to a characteristic of the invention, the minimum width DC of the foot portion 30C is preferably greater than or equal to 60% of the maximum width Dmax of the second passage opening 30. Further preferably, the minimum width DC of the foot portion 30C is greater than or equal to 70%, preferably 80%, further preferably 90%. In an analogous manner, the length L3 of the foot portion 30C is preferably greater than or equal to 20% of the maximum length Lmax of the second passage opening 30, preferably 30%, preferably 40%, preferably 50%, further preferably 60%.

Also, thanks to the profile of the second passage opening 30 according to the invention, when the overall passage opening 10 passes from the low flow rate position, to the intermediate flow rate position then to the high flow rate position, ice particles 19 building up on the edges of the overall passage opening 10 do not obstruct such an opening, making it possible to ensure a sufficient fuel flow rate to enable the combustion of fuel in the combustion chamber. Any malfunction is thus avoided.

Such a profile of the overall passage opening 10 makes it possible to pass from an opening having a small opening surface (low flow rate position) to an opening having a large opening surface (high flow rate position) without important variation in the head loss of the injector enabling, under the effect of a limited increase in pressure, a strong evolution of the surface of the overall passage opening 10, ensuring when it is necessary the maintaining of a high fuel flow rate despite fuel icing conditions. Such a distributor valve 1 advantageously makes it possible to be free, in the event of low temperature, of the obstruction of the overall passage opening 10 due to the build up of ice particles 19. Indeed, the width of the second passage opening 30 is sufficiently important to prevent any progressive build up of ice particles.

In other words, thanks to the distributor valve 1 according to the invention and unlike the distributor valve of the prior art, even in the event of icing, a sufficient input of fuel is ensured in the combustion chamber, while ensuring a sufficient overall passage opening 10 to enable a sufficient fuel flow rate. Indeed, when the distributor valve 110 of the prior art is in the high flow rate position, wherein the foot portion of the second passage opening 112 is to a large extent opposite the first passage opening 111, the distributor valve 110 of the prior art has an insufficient overall passage opening 113 to ensure the required fuel flow rate on account of the icing built up progressively. In comparison, the profile of the second passage opening 30 and notably the dimensions of the foot portion 30C according to the invention advantageously make it possible to ensure an important flow rate conforming to the flow rate required by the high flow rate position of the second element 3 with respect to the first element 2. Moreover, the length and the width of the foot portion 30C prevent ice particles from building up on the periphery of the foot portion 30C. Operability is thus maintained.

A method for operating a distributor valve 1 according to the invention, according to a preferred embodiment, will henceforth be described when the injector 100 is subjected to low temperatures leading to the formation of icing, in particular at high flow rate.

For reasons of clarity, the operating method is described by means of different sequential steps. However, the operating method remains continuous and progressive as described hereafter.

Such an operating method firstly comprises a preliminary step of determining the fuel flow rate to apply in the injector 100.

The pressure difference between the inlet pressure P1 and the intermediate pressure P2 enables the placement according to a first position of the second element 3 enabling the positioning of the head portion 30A and the intermediate portion 30B of the second passage opening 30 opposite the first passage opening 20.

When ice particles 19 next begin to obstruct the second passage opening 30, the overall passage section is then reduced.

The second element 3 is translated with respect to the first element 2 so as to uncover the foot portion 30C of the second passage opening 30. On account of the strong variation in profile of the second passage opening 30, such a translation advantageously makes it possible to increase in an important manner the overall passage opening 10 making it possible to ensure the determined fuel flow rate despite the presence of icing 19. Thanks to the invention, the overall passage opening 10 is only very slightly decreased.

Furthermore, given the coldest temperature conditions that the fuel stored in the tanks of an aircraft may encounter, it is known to determine a fuel flow rate threshold above which the fuel does not have sufficient time to heat up in the engine before arriving at the fuel injector 100. This signifies that if the flow rate arriving at the injector is greater than this threshold flow rate limiting the icing domain, the fuel temperature may remain below 0° C. and ice particles are thus liable to form in the fuel. Hereafter, such a fuel flow rate threshold is designated "icing threshold" and is predetermined.

According to an aspect of the invention, if the current fuel flow rate is above the icing threshold, the method comprises a step of translation of the second element 3 relative to said first element 2 so as to place at least the head portion 30A and the intermediate portion 30B opposite the first passage opening 20.

Preferably, when the icing threshold is exceeded, the head portion 30A, the intermediate portion 30B and the foot portion 30C are placed opposite the first passage opening 20. Thus, in icing conditions, the overall passage opening 1 makes it possible to increase the flow rate through anticipation of potential icing, which guarantees optimal operation.

According to one operating mode, in the absence of icing, the overall passage opening 10 remains limited at the head portion 30A even at high flow rate. The injector thus comprises a lengthened passage opening to act against icing.

According to another operating mode, in the absence of icing, the overall passage opening 10 may extend up to the foot portion 30C. Such an operating mode makes it possible to improve the compactness of the injector.

The invention claimed is:

1. A distributor valve for a fuel injector of a fuel injection system of an aircraft, said fuel injector comprising a fuel inlet, a primary outlet configured to emerge in a combustion chamber and connected to the fuel inlet by a primary stream, a secondary outlet configured to emerge in the combustion chamber and connected to the fuel inlet by a secondary stream and the distributor valve, mounted in the secondary stream, which makes it possible to supply a given fuel flow rate as a function of a pressure difference between an inlet pressure measured at the fuel inlet and an intermediate pressure measured in the secondary stream between the distributor valve and the secondary outlet, said distributor valve comprising:

a first element comprising a first passage opening;
a second element comprising a second passage opening;
the second element being displaceable relative to said first element, according to a translation movement along a given axis X as a function of the pressure difference between the inlet pressure and the intermediate pressure, so as to form an overall fuel passage opening of variable section;
the overall fuel passage opening varying between a low flow rate position wherein the second passage opening is partially opposite the first passage opening and a high flow rate position wherein the second passage opening is to a large extent opposite the first passage opening;
the second passage opening extending over a maximum length defined along the axis X and having a radial section, radial to the axis X, having a profile comprising a foot portion, an intermediate portion, and a head portion;
the head portion, the intermediate portion and the foot portion are located opposite the first passage opening when the overall passage opening evolves between the low flow rate position and the high flow rate position;
wherein:
the head portion of the second passage opening comprises a first inclination having a first average slope;
the intermediate portion of the second passage opening comprises a second inclination having a second average slope strictly greater than said first average slope; and
the foot portion comprises a third inclination having a third average slope less than said second average slope and the foot portion extends over a length equal to at least 40% of the maximum length, the foot portion comprising a minimum width DC at a curvature point C at an interface between the foot portion and the intermediate portion, the minimum width DC being greater than or equal to 60% of a maximum width Dmax of the second passage opening.

2. The distributor valve according to claim 1, wherein the head portion comprises a maximum width DB at a curvature point B at an interface between the head portion and the intermediate portion, the ratio of the widths DC/DB is greater than a threshold S which is greater than or equal to 2.

3. The distributor valve according to claim 2, wherein the threshold S is greater than or equal to 2.5.

4. The distributor valve according to claim 1, wherein the minimum width DC is greater than or equal to 80% of the maximum width of the second passage opening.

5. The distributor valve according to claim 1, wherein the foot portion of the second passage opening extends over a length equal to at least 50% of the maximum length.

6. The distributor valve of claim 1, wherein the second passage opening is substantially symmetrical about the axis X.

7. The distributor valve of claim 1, wherein the head portion of the second passage opening has a width that progres sly increases in a direction of the intermediate portion without decreasing.

8. The distributor valve of claim 7, wherein the foot portion progressively increases from the minimum width DC to a maximum width Dmax at an end of the maximum length.

9. The distributor valve of claim 1, wherein the profile of the second passage opening has a concave profile that transitions into a convex profile at the intermediate portion and the head portion.

10. The distributor valve of claim 1, wherein the second passage opening has a variable diameter that progressively increases from the head portion to the foot portion without decreasing.

11. A method for operating a distributor valve for a fuel injector of a fuel injection system of an aircraft, said method comprising:
   a step of comparing a current fuel flow rate with a predetermined icing threshold;
   a step of positioning a head portion and an intermediate portion of a second passage opening of the distributor valve opposite a first passage opening of the distributor valve in the event of exceeding said predetermined icing threshold;
   a first element comprising the first passage opening;
   a second element comprising the second passage opening;
   the second element being displaceable relative to said first element, according to a translation movement along a given axis X as a function of the pressure difference between the inlet pressure and the intermediate pressure, so as to form an overall fuel passage opening of variable section;
   the overall fuel passage opening varying between a low flow rate position wherein the second passage opening is partially opposite the first passage opening and a high flow rate position wherein the second passage opening is to a large extent opposite the first passage opening;
   the second passage opening extending over a maximum length defined along the axis X and having a radial section, radial to the axis X, having a profile comprising the foot portion, the intermediate portion, and the head portion;
   the head portion, the intermediate portion, and the foot portion are located opposite the first passage opening when the overall passage opening evolves between the low flow rate position and the high flow rate position; wherein:
      the head portion of the second passage opening comprises a first inclination having a first average slope;
      the intermediate portion of the second passage opening comprises a second inclination having a second average slope greater than said first average slope; and
      the foot portion comprises a third inclination having a third average slope less than said second average slope and the foot portion extends over a length equal to at least 20% of the maximum length.

12. The method according to claim 11, further comprising:
   a step of partial positioning of the head portion of the second passage opening opposite the first passage opening,
   a step of translating the second element relative to said first element in the event of obstruction by ice particles of the head portion of the second passage opening opposite the first passage opening so as to increase the overall fuel passage opening.

13. The method according to claim 11, said method further comprising:
   a step of positioning the head portion, the intermediate portion and the foot portion of the second passage opening opposite the first passage opening in the event of exceeding said predetermined icing threshold.

14. The method of claim 11, wherein the second passage opening is substantially symmetrical about the axis X.

15. The method of claim 11, wherein the head portion of the second passage opening has a width that progresly increases in a direction of the intermediate portion without decreasing.

16. The method of claim 15, wherein the foot portion progressively increases from the minimum width DC to a maximum width Dmax at an end of the maximum length.

17. A distributor valve for a fuel injector of a fuel injection system of an aircraft configured to supply a given fuel flow rate as a function of a pressure difference between two points, said distributor valve comprising:
   a first element comprising a first passage opening;
   a second element comprising a second passage opening;
   the second element being displaceable relative to said first element according to a translation movement along a given axis X as a function of the pressure difference so as to form an overall fuel passage opening of variable section;
   the overall fuel passage opening varying between a low flow rate position wherein the second passage opening is partially opposite the first passage opening and a high flow rate position wherein the second passage opening is to a large extent opposite the first passage opening;
   the second passage opening extending over a maximum length defined along the axis X and having a radial section, radial to the axis X, having a profile comprising a foot portion, an intermediate portion, and a head portion;
   the head portion, the intermediate portion, and the foot portion are located opposite the first passage opening when the overall passage opening changes between the low flow rate position and the high flow rate position; wherein:
      the head portion of the second passage opening comprises a first inclination having a first average slope and a width that progressively increases;
      the intermediate portion of the second passage opening comprises a second inclination having a second average slope greater than said first average slope;
      the foot portion comprises a third inclination having a third average slope less than said second average slope and the foot portion extends over a length equal to at least 20% of the maximum length, the foot portion comprising a minimum width DC, and
      the head, intermediate, and foot portions are connected via a wall, such that the wall forms a smooth and continuous curvature from the head portion to the foot portion.

18. The distributor valve of claim 17, wherein the width of the foot portion progressively increases from the minimum width DC to maximum width Dmax at an point of the foot portion along the axis X.

19. The distributor valve of claim 17, wherein the profile of the second passage opening has a concave profile that transitions into a convex profile at the intermediate portion and the head portion.

20. The distributor valve of claim 17, wherein the foot portion comprising a minimum width DC at a curvature point C at an interface between the foot portion and the intermediate portion, the minimum width DC being greater than or equal to 60% of a maximum width Dmax of the second passage opening.

* * * * *